(12) United States Patent
Francois

(10) Patent No.: US 6,786,418 B1
(45) Date of Patent: Sep. 7, 2004

(54) SMART CARD CUSTOMIZING SYSTEM

(75) Inventor: Maurel Francois, Gemenos (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/831,147

(22) PCT Filed: Oct. 27, 1999

(86) PCT No.: PCT/FR99/02608

§ 371 (c)(1),
(2), (4) Date: Aug. 20, 2001

(87) PCT Pub. No.: WO00/28489

PCT Pub. Date: May 18, 2000

(30) Foreign Application Priority Data

Nov. 5, 1998 (FR) .......................................... 98 13938

(51) Int. Cl.[7] .............................................. G06K 19/06
(52) U.S. Cl. .......................... 235/492; 235/380; 705/21
(58) Field of Search ................................ 235/492, 380; 705/17, 18, 21; 257/679; 706/10; 364/514 R; 395/186

(56) References Cited

U.S. PATENT DOCUMENTS

| | | | |
|---|---|---|---|
| 5,592,400 A | | 1/1997 | Sasou et al. |
| 5,721,768 A | * | 2/1998 | Stimson et al. ......... 379/114.16 |
| 5,889,941 A | * | 3/1999 | Tushie et al. ................ 235/380 |
| 6,119,183 A | * | 9/2000 | Briel et al. .................. 710/100 |
| 6,151,297 A | * | 11/2000 | Congdon et al. ............ 370/216 |
| 6,196,459 B1 | * | 3/2001 | Goman et al. ............... 235/380 |
| 6,325,292 B1 | * | 12/2001 | Sehr ............................ 235/375 |
| 6,367,011 B1 | * | 4/2002 | Lee et al. .................... 380/255 |

FOREIGN PATENT DOCUMENTS

| | | |
|---|---|---|
| EP | 0297964 A | 1/1989 |
| WO | 9739424 A | 10/1997 |

* cited by examiner

Primary Examiner—Diane I. Lee
Assistant Examiner—Lisa M. Caputo
(74) Attorney, Agent, or Firm—Burns, Doane, Swecker & Mathis, L.L.P.

(57) ABSTRACT

A system for customizing smart cards wherein data must be registered so as to be adapted to the use for which they are designed. Each customizing machine having several customizing stations is connected to a computer equipped with a multi-port card by a serial type computer connection of the multi-port card, which transmits cryptographic data of peripheral devices. The customizing data is supplied by a control device via a communication bus. The invention is applicable to microprocessor cards.

17 Claims, 2 Drawing Sheets

SMART CARD CUSTOMIZING SYSTEM

This disclosure is based upon, and claims priority from French Application No. 98/13938, filed on Nov. 5, 1998 and International Application No. PCT/FR99/02608 filed Oct. 27, 1999, which was published on May 18, 2000 in a language other than English, the contents of which are incorporated herein by reference.

BACKGROUND OF THE INVENTION

The invention relates to smart cards and, more particularly, a system for the mass customizing of microcircuit cards.

Microcircuit card means a plastic card in the thickness of which a microcircuit is housed. According to the usage of the card, it is necessary to record data issuing from a data and calculation file in the memory of a microcircuit, notably a chip with or without a microprocessor. These operations are called "customization" of the microcircuit card and are carried out by a customizing machine. The time taken to carry out these operations is between 15 and 30 seconds per card for cards used in mobile telephones, for example.

These operations are carried out by a machine comprising several customizing lines or appliances in parallel, which each comprise a reader/encoder in which the customizing program is downloaded and which functions autonomously by means of a microprocessor.

The customized data of each card are supplied to the reader/encoder by a peripheral device via a communication bus associated with a control device.

However, in order to take account of the security aspects, it is necessary to provide additional functions, such as:

calculating so-called transportation keys for releasing the microcircuit before the customizing operations, calculating a session key for protecting the data to be introduced into the card, and calculating a certificate which authorises the creation of a directory or a file.

These functions entail a dialogue between each customizing appliance and a peripheral device, notably for each file or directory creation, and hence a very high exchange of data.

At the present time, these data exchanges are effected by means of a communication bus which connects each customizing appliance, station or line to a peripheral encrypting device capable of calculating the certificates for creating each file, and this for each card. However, the capacity of the bus is insufficient for Managing such a volume of data exchanges.

SUMMARY OF THE INVENTION

One aim of the present invention is therefore to produce a smart card customizing system which does not have the limitations of the systems of the prior art, by improving the data exchange flows between the customizing lines or appliances and the peripheral encrypting devices.

This aim is achieved by using an architecture for communication between the customizing appliances or lines and the peripheral devices in which on the one hand the customizing lines receive customizing data through a communication and on the other hand a data server supplies the encrypting data to the customizing lines by means of computer links, the encrypting data being supplied by peripheral encrypting devices via computer links.

This architecture makes it possible to limit the data traffic on the communication bus by allocating it to the customizing data, the encrypting data being conveyed by other computer links.

Moreover, in the prior art, each customizing station is designed to act on a data server in a predetermined fashion.

The drawback lies in the risk of a request to a data server from two or more customizing stations at the same time when another data server is available. This causes a wait in the task of the customizing station.

Another aim of the invention is therefore to optimise the response time of a data server vis-a-vis a request from a customizing station.

This aim is achieved by having recourse to an interface management means, disposed between the customizing machines and the servers, which is informed about and takes account of the availability of a server for responding as quickly as possible to the request from a customizing station.

The invention concerns a smart card customizing system characterised in that it comprises:

at least one customizing machine each equipped with at least one customizing station sending customizing data requests;

at least one customizing data server delivering customizing data;

at least one management interface connected on the one hand to at least one of the said customizing machines and on the other hand to at least one of the said data servers by a bi-directional link, the said management interface receiving the said requests, transmitting them to at least one of the said servers, receiving the corresponding response and transmitting it to the requesting customizing station, characterised in that the said management interface is able to manage the transmission of the applications/requests or customizing data requirements to at least one of the said servers as soon as they are received and as soon as the said server is available.

The management interface coordinates the execution at the same time or periodically and for each customizing station of at least the following types of task:

monitoring the occurrence of a request, monitoring the availability of each server, transmitting the request to a server as soon as it is available, receiving the data responding to the request, transmitting the response data to the requesting customizing station as soon as they are received.

This management interface comprises:

a computer equipped with a multiway card, each data server and each customizing station being respectively connected to the computer by a serial link on the multiway card, a multitask real-time operating system for performing the said tasks at the same time and in real time.

Thus this system makes it possible, for a production site, to determine the necessary and sufficient data server requirements with respect to a profitability or productivity objective. In fact, in the prior art, in order to achieve the same objective, it was necessary to have excess data servers, which can be very costly.

The invention also makes it possible:

to interface all types of machines coming from different manufacturers and having different communication configurations;

to optimise to the maximum possible extent the sharing of resources external to the customizing method, namely:

data server, enciphering "black" boxes, any other peripheral necessary for electrical customization (access control module, notably in the form of a smart card etc);

to optimise to the maximum possible extent the sharing of these resources with one or more customizing machines;

to physically separate the data server (which may be physically in a very highly protected area, and to dialogue with the data server/management interface in a protected message).

This data server/management interface is based on a real-time PC system which is "cascadable", which means that several management interfaces can be connected together in a cascade by a local network. It is thus possible to increase the power of the customizing system, the operating system of a management interface being able to manage the whole directly. This ability is particularly advantageous since it confers very great flexibility on the customizing system.

BRIEF DESCRIPTION OF THE DRAWINGS

Other characteristics and advantages of the present invention will emerge from a reading of the following description of a particular example embodiment, the said description being given in relation to the accompanying drawing, in which.

DETAILED DESCRIPTION

A smart card customizing system according to the invention comprises, for example, four customizing machines MP1 to MP4, which are each connected to a data server SD by computer links of the serial type LS.

Each customizing machine MP1, MP2, MP3 or MP4 for smart cards CP comprises, for example for the machine MP1, for example six customizing lines or stations PP1 to PP6 in parallel for simultaneously customizing six smart cards CP1 to CP6, a control device DC containing the customizing data for each card to be customized, a communication bus BC for transmitting, to each customizing station PP1 to PP6 the customizing data for each smart card CP1 to CP6 supplied by the control device DC, computer links of the serial type LS1 to LS6, at least one per customizing station, for transmitting to each customizing station the cryptographic data for each card being customized.

Each customizing station PP1 to PP6 comprises:

a reader/encoder referenced LE1 for the station PP1 and LE6 for the station PP6, this reader/encoder, more commonly referred to as a reader, being for example the one sold by the applicant under the reference GCI400DC, a microprocessor, referenced TBP1 for the station PP1 and TBP6 for the station PP6, each microprocessor having two computer links of the serial type, one LS1 to LS6 to the data server SD and the other LL1 to LL6 to the reader/encoder.

The data server SD comprises:

a computer such as a personal computer PC which is equipped with a multiway card CM, a multitask real-time system, for example six peripheral encrypting devices DEP1 to DEP6, the initials DEP being the acronym for the English expression "Data Encryption Peripheral", these peripheral devices DEP1 to DEP6 each being connected to the computer PC by a serial link LD1 to LD6 on the multiway card CM.

Figure 1:
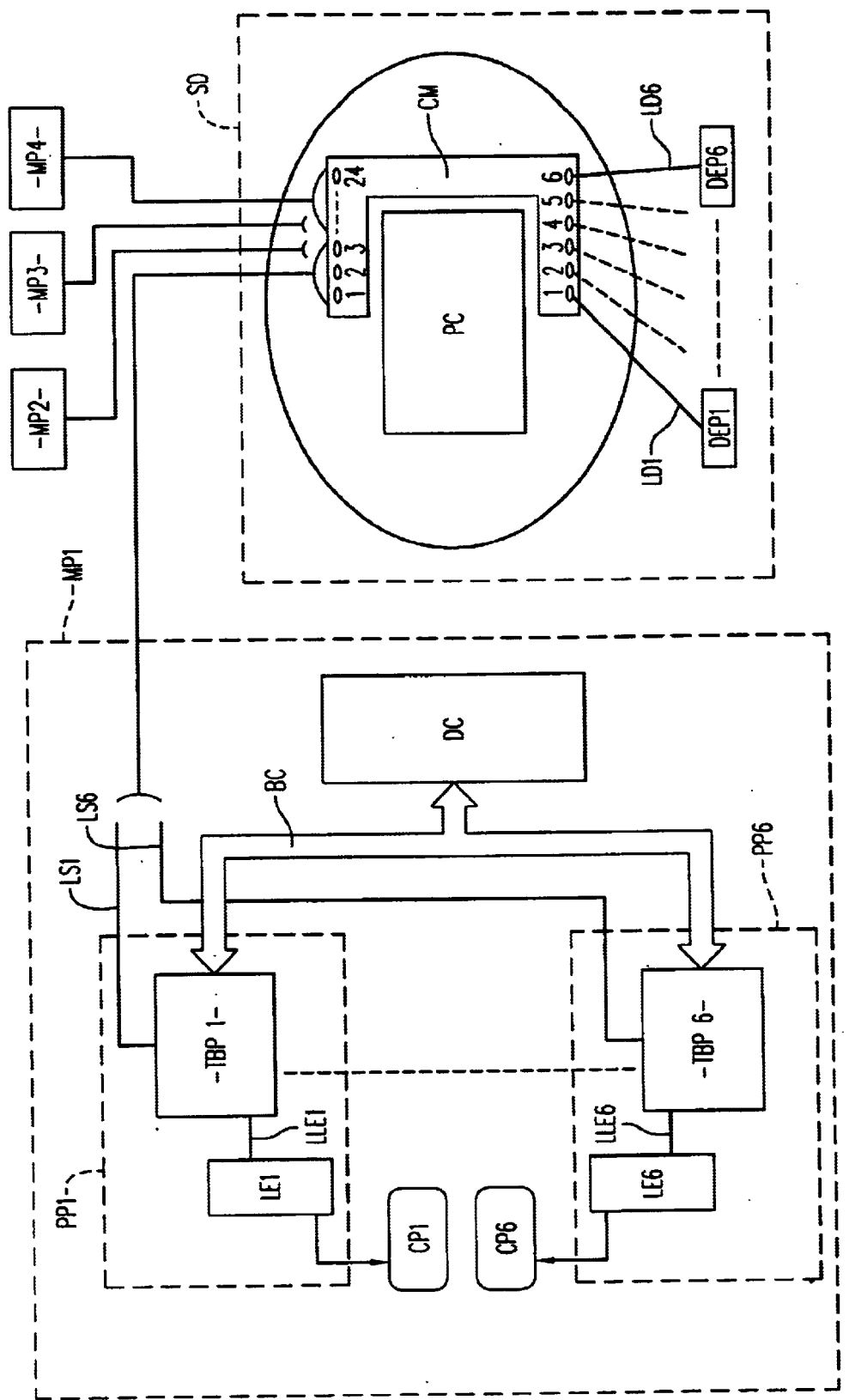
FIG. 1 is a functional diagram of a smart card customizing system according to the invention.

In the diagram in FIG. 1, the data server SD is designed to manage four customizing machines MP1 to MP4 each having six customizing stations, each customizing station being connected by a serial link LS to an input of the multiway card CM.

The function of the computer PC is to manage the cryptographic data requests of each customizing station by addressing the peripheral devices DEP1 to DEP6 via the serial links LD1 to LD6 and transmitting the cryptographic data to the customizing appliance via the serial links LS1 to LS6.

In this example embodiment, each microprocessor TBP is equipped with two serial links LS, one LS to the computer PC and the other LLE to the reader/encoder LE. However, where the microprocessor TBP is equipped not with two serial links but with an eight-conductor connector COS, as shown in FIG. 2 for example, some of these conductors may be used for effecting serial links using an adaptation device DA which comprises two adaptors for serial connection SLA1, SLA2 and a switching circuit RS according to the diagram in FIG. 2.

Figure 2:
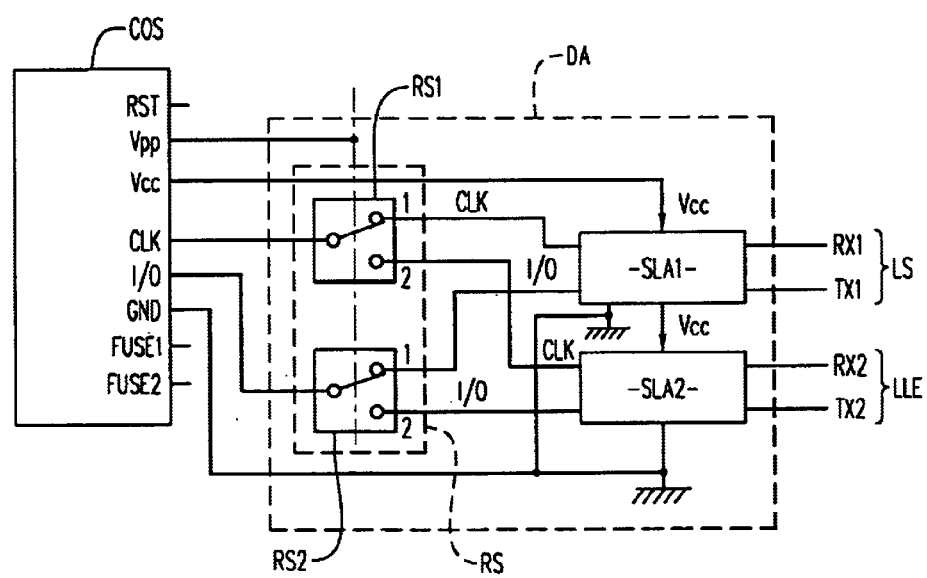
FIG. 2 is a diagram of a device which makes it possible to convert a connector into two serial-type computer links.

FIG. 2 depicts the eight terminals of an output connector COS comprising:

a terminal RST for resetting, a terminal $V_{pp}$ for the programming voltage, a terminal $V_{cc}$ for the supply voltage, a terminal CLK for the clock signal, a terminal I/O for the data signals, a terminal GND for the earth potential, a terminal FUSE 1 for a first programming fuse, a terminal FUSE 2 for a second programming fuse.

To effect a single serial link, the terminals CLK, I/O, $V_{cc}$ and GND are connected to an adaptor which supplies the serial signals on two output terminals Rx and Tx.

To effect two serial links, the terminals CLK and I/O are connected to a double switch RS whose position is controlled by the signal on the terminal $V_{pp}$. A first switch RS1 is connected to the clock terminal CLK by its input terminal and to the input terminal CLK of two adaptors SLA1 and SLA2 by its two output terminals. A second switch RS2 is connected to the terminal I/O by its input terminal and to the input terminals I/O of the two adaptors SLA1 and SLA2 by its two output terminals.

The terminal $V_{pp}$ is connected to the two switches RS1 and RS2 whilst the terminals $V_{cc}$ and GND are connected to the adaptors SLA1 and SLA2. These adaptors SLA1 and SLA2 each have two output terminals Rx1, Tx1 and Rx2 and Tx2 which effect, for example respectively, the serial link LS with the server SD and the serial link LLE with the reader/encoder LE.

As is known, the terminal Tx1 or Tx2 is allocated to the transmission of the signal whilst the terminal Rx1 or Rx2 is allocated to the reception of the signal.

What is claimed is:

1. A smart card customizing system comprising:

at least one customizing machine equipped with at least one customizing station that sends customizing data requests;

at least one customizing data server that delivers customizing data and;

at least one management interface connected to said customizing machine and to said data sever by a bi-directional link, said management interface receiving said requests and transmitting them to at least one of said servers as soon as they are received and as soon as said server is available, and receiving the corresponding response and transmitting said response to the requesting customizing station.

2. The smart card customizing system of claim 1, wherein said management interface coordinates the execution of at least the following types of tasks at the same time for each customizing station:

monitoring the occurrence of a request, monitoring the availability of each server, transmitting the request to a server as soon as it is available, receiving the data responding to the request, and transmitting the response data to the requesting customizing station as soon as they are received.

3. The smart card customizing system of claim 1, wherein said management interface has:

a computer equipped with a multi-port card, each data server and each customizing station being respectively connected to the computer by a serial link on the multi-port card, and a multitask real-time operating system for operating said tasks at the same time and in real lime.

4. The smart card customizing system of claim 1, wherein each customizing station comprises:

a microprocessor, a reader/encoder, a first computer link of the serial type between the microprocessor and a computer of the server, and a second computer link of the serial type between the microprocessor and the reader-encoder.

5. The smart card customizing system of claim 4, wherein the first and second computer links of the serial type are produced by connecting predetermined output terminals of an output connector of the microprocessor to an adaptation device.

6. The smart card customizing system of claim 5, wherein the adaptation device comprises:

a switching circuit comprising two switches whose input terminal is connected to a dock output terminal and to an output terminal for data signals, the switching being controlled by a programming signal on another predetermined output terminal, two adaptor circuits, the two input terminals of which are each connected to an output terminal of a switch, said adaptor circuits also being connected to an output terminal for the electrical power supply and to a ground reference output terminal of the output connector.

7. The smart card customizing system of claim 1, wherein said server is an enciphering data server.

8. The smart card customizing system of claim 1, further including a control device for supplying additional customizing data, said device being connected by means of a communication bus to each customizing station of a customizing machine.

9. The smart card customizing system of claim 1, wherein said customizing machine comprises a plurality of customizing stations, each of which is connected to said management interface via a respective bi-directional link.

10. The smart card customizing system of claim 1, comprising a plurality of customizing machines, each of which is connected to said management interface via at least one respective bi-directional link.

11. The smart card customizing system of claim 10, wherein each customizing machine comprises a plurality of customizing stations, each of which is connected to said management interface via a respective bi-directional link.

12. The smart card customizing system of claim 1 wherein said data server includes a plurality of devices that deliver customizing data and that are connected to said management interface via respective serial links.

13. A smart card customizing system, comprising:

a plurality of customizing stations that send requests for customizing data;

a plurality of devices that deliver customizing data; and a management interface connected to each of sod customizing stations via respective serial links and to each of said devices via respective serial links, and that is responsive to requests received from said customizing stations to deliver them to an available one of said devices, and to transmit customizing data delivered by said devices in response to said requests to the requesting customizing stations.

14. The smart card customizing system of claim 13 wherein said management interface includes a computer having a multiport card connected to said serial links, and a multi-tasking system responsive to said requests for addressing said devices via said multiport card.

15. The smart card customizing system of claim 13 wherein said devices provide cryptographic data.

16. The smart card customizing system of claim 15 further including a control device that provides additional customizing data to said customizing stations.

17. The smart card customizing system of claim 16 wherein said control device is connected to said customizing stations by means separate from said serial links.

* * * * *